(12) United States Patent
Gupta et al.

(10) Patent No.: US 12,298,868 B2
(45) Date of Patent: May 13, 2025

(54) PRIORITIZED RECOVERY OF FILES DURING FAILBACK

(71) Applicant: Dell Products L.P., Round Rock, TX (US)

(72) Inventors: Kaushik Gupta, Pune (IN); Shiv S. Kumar, Pune (IN)

(73) Assignee: DELL PRODUCTS L.P., Round Rock, TX (US)

(*) Notice: Subject to any disclaimer, the term of this patent is extended or adjusted under 35 U.S.C. 154(b) by 0 days.

(21) Appl. No.: 18/458,013

(22) Filed: Aug. 29, 2023

(65) Prior Publication Data
US 2025/0077359 A1    Mar. 6, 2025

(51) Int. Cl.
*G06F 7/00* (2006.01)
*G06F 11/14* (2006.01)
(52) U.S. Cl.
CPC ...... *G06F 11/1469* (2013.01); *G06F 2201/84* (2013.01)
(58) Field of Classification Search
CPC .......... G06F 11/1469; G06F 2201/84
USPC .................................... 707/600–899
See application file for complete search history.

(56) References Cited

U.S. PATENT DOCUMENTS

2015/0234703 A1* 8/2015 Udayashankar .... G06F 11/1004
707/646

* cited by examiner

*Primary Examiner* — Isaac M Woo
(74) *Attorney, Agent, or Firm* — Amin, Turocy & Watson, LLP

(57) ABSTRACT

A system can maintain a record of first files that have been accessed via at least one of a group of priority user accounts, wherein the record is maintained as a least recently used structure, and wherein the first files belong to a group of files. The system can, in response to determining that the group of files is to be backed up, traverse the record of files from a head of the least recently used structure, and, for respective first files of the record of first files, create respective backup tasks for the respective first files. The system can, after backing up the respective first files, perform a backup of second files of the group of files that are omitted from the record of first files.

20 Claims, 12 Drawing Sheets

200

PRIORIZED RECOVERY OF FILES
DURING FAILOVER COMPONENT 208

| GFID 204 | LRU ITEM 206 |
|---|---|
| XYZ | ADDR(ITEM_2) |
| ABC | ADDR(ITEM_1) |
| PQR | ADDR(ITEM_4) |
| DEF | ADDR(ITEM_3) |

FIG. 2

PRIORITIZED RECOVERY OF FILES DURING FAILBACK

BACKGROUND

As part of data protection, computer files can be backed up, and restored as part of failback.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can maintain a record of first files that have been accessed via at least one of a group of priority user accounts, wherein the record is maintained as a least recently used structure, and wherein the first files belong to a group of files. The system can, in response to determining that the group of files is to be backed up, traverse the record of files from a head of the least recently used structure, and, for respective first files of the record of first files, create respective backup tasks for the respective first files. The system can, after backing up the respective first files, perform a backup of second files of the group of files that are omitted from the record of first files.

An example method can comprise maintaining, by a system comprising a processor, an identification of first files that have been accessed by at least one of a group of priority user accounts, and wherein the first files belong to a group of files. The method can further comprise, in response to determining to back up the group of files, traversing, by the system, a least recently used ordering of the first files, and for respective first files of the first files, creating, by the system, respective backup tasks for the respective first files. The method can further comprise, after backing up the respective first files, performing, by the system, a backup of second files of the group of files that are omitted from the identification of first files.

An example non-transitory computer-readable medium can comprise instructions that, in response to execution, cause a system comprising a processor to perform operations. These operations can comprise, in response to determining to back up a group of files that comprises first files that have been accessed by at least one of a group of priority user accounts, traversing a least recently used ordering of the first files, and, for respective first files of the first files, creating respective backup tasks for the respective first files. These operations can further comprise, after backing up the respective first files, performing, by the system, a backup of second files of the group of files that are omitted from the least recently used ordering of the first files.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 2 illustrates an example system architecture of a key-value store, and that can facilitate prioritized recovery of files during failback, in accordance with an embodiment of this disclosure;

DETAILED DESCRIPTION

Overview

Figure 1:
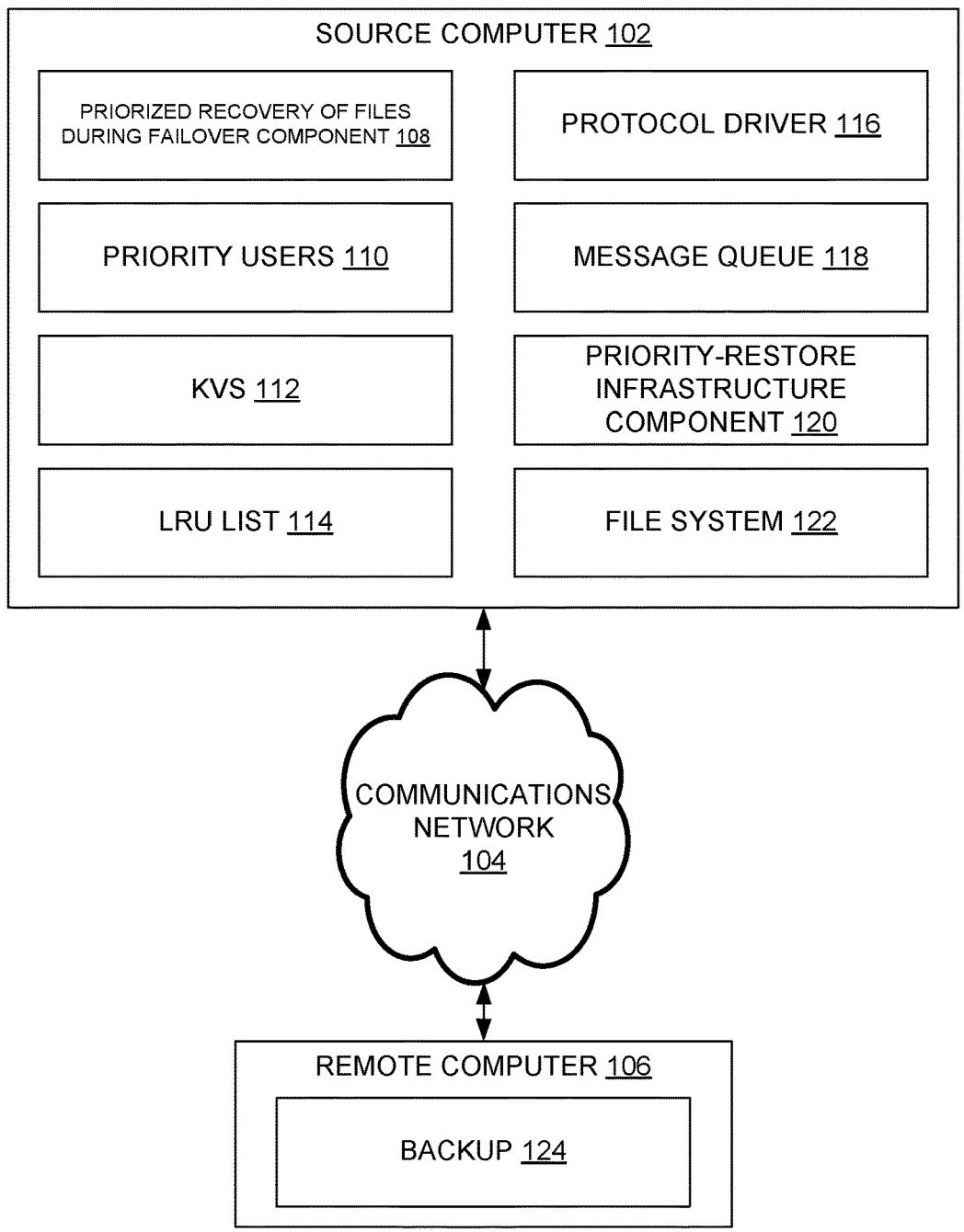
FIG. 1 illustrates an example system architecture that can facilitate prioritized recovery of files during failback, in accordance with an embodiment of this disclosure.

The present techniques can be implemented to facilitate keeping track of important files such that those important files can be restored first when restoring a group of files.

During a dark site data recovery, it can take a significant amount of time to recover all files from the backup site. It can be that prior approaches lack a way to fetch files from important users first. Given that, there can be a possibility that an important user's file is recovered last. The present techniques can be implemented to facilitate identifying and maintaining important files. These files can have a higher priority than other files during operations such as failback and backup. Failback can generally comprise maintaining two computers, with one computer being a primary computer that serves requests and the other being a backup computer. When there is an issue with the primary computer, a failback can be performed to switch the primary status to the backup computer.

The present techniques can be implemented to facilitate maintaining a file as an important file based on user access; and recovering files from important users at a highest priority. That is, according to the present techniques, it can be that, if a file is written or modified by an important user, that file will be deemed as important and recovered on priority.

The admin can mark users as important users. Whenever a user is marked as an important user, a signal hang up (SIGHUP) message can be sent to protocol drivers that process file operations. The protocol drivers can reconfigure their respective config and transfer the config information to memory. That is, config information can be persisted in storage, and then propagated to memory for quick access.

It can then be that each completion callback (e.g., for writes and modifies) can check if the user is part of the important users list. Where the user is not important, it can be that the file operation concludes without further operations. If the user is important, a work item can be enqueued to a message queue. Messages from the message queue can be received by a priority-restore infrastructure (PRI).

In addition to managing the message queue, the PRI can maintain a key-value store (KVS), and a least recently used (LRU) list.

A LRU list can comprise LRU items, which can have a data structure similar to the following:
struct pri_lru_item {
  struct lru_item *next, *prev;
  uint64_t gfid;
  uint64_t time_stamp;
};

That is, a LRU item can comprise a pointer to a next LRU item in the LRU list, a pointer to a previous LRU item in the LRU list, a file identifier of a file (which can be referred to as a global file identifier (GFID)) that has been modified by an important user, and a time at which the file was last modified.

A KVS can comprise KVS items, or pairs, which can have a data structure similar to the following:
struct pri_kvs_item {
  uint64_t gfid;
  struct pri_lru_item *lru_item;
};

That is, a KVS item can comprise a file identifier, and a pointer to a LRU item in the LRU list that corresponds to that file identifier. That is, the KVS can store an address of each LRU item in the LRU list.

The LRU list can be arranged so that the LRU item with the latest time stamp is located at a beginning (or head) of the LRU list, and an item with the oldest time stamp is located at the end (or tail) of the list.

When a work item is identified by the PRI, if the GFID for the file exists, the KVS can have stored the address of the LRU item. Based on that, the corresponding LRU item can be directly accessed, and moved to the head of the LRU list, in addition to updating the timestamp of that LRU item.

If the GFID of the files does not exist, a KVS item (sometimes referred to as an entry) for the GFID and a corresponding LRU item can be made. Then both the KVS and the LRU list can be updated accordingly.

According to the present techniques, a LRU job can be handled as follows. It can be that files that are updated by important users are not to maintain an important status forever. Rather, least-recently used files can be weeded out, and no longer identified as being important. To do this, a LRU job can be run at scheduled times (in some examples, these times can be defined by an administrator). The LRU job can traverse the LRU list starting at the end of the LRU list, and LRU items to see if their timestamp is old enough to remove from the LRU list. If that is the case, the LRU item can be removed from the LRU list, and the GFID identified in the LRU item can be used to identify the corresponding KVS item, and that KVS item can be removed from the KVS.

According to the present techniques, multiple priorities can be handled as follows. In some examples, multiple different priorities can be maintained for different sets of users, where a different LRU list is maintained for each priority. In a case of failback or backup, files can be attended to based on their respective priorities (e.g., files with a top priority first, then files with a lower priority, then files with no identified priority).

According to the present techniques, backup can be handled as follows. A backup job can first traverse the LRU list from its head, and create a file transfer task for each file identified in the LRU list. GFIDs of restored files can be preserved so that the same file is not processed twice (that is, the preserved GFIDs can be used to make sure that priority files are not again backed up when non-priority files are backed up). It can be that, once all files identified in the LRU list are restored, normal backup can begin.

When restoring for a particular directory, it can be that a GFID is used to fetch a corresponding file name, and thus a corresponding directory name.

An approach to mark a file as important when it is modified, and to remove files from a LRU list as they age as part of backing files up can facilitate failback and/or recovery from that backup. That is, this maintained list of important files can be used to prioritize which files are first recovered.

Recovery, according to the present techniques, can involve traversing a LRU list, fetching a GFID for each file, getting a file name for each GFID, and restoring a file for each file name. A GFID can map file paths on both source and target systems, like in this example:

| GFID | Source-path | Target-Path |
| --- | --- | --- |
| GFID_1 | /home/jdoe/a | /backup/last_backup/home/jdoe/a |

Where a particular directory (of a larger part of a file system that has been backed up, and for which a LRU list is maintained) is being recovered, this recovery can be performed as follows. For each LRU item in a LRU list, a GFID can be retrieved. If the GFID corresponds to a file that is part of a directory being restored, then prioritize restoring the corresponding file, and otherwise do not. Using the above example GFID (GFID_1), where directory /home/jdoe/ is being restored on the source computer, prioritized recovery can be performed for this file, /home/jdoe/a. And where directory /home/jsmith/ is being restored, it can be that /home/jdoe/a does not receive prioritized recovery.

Example Architectures

FIG. 1 illustrates an example system architecture 100 that can facilitate prioritized recovery of files during failback, in accordance with an embodiment of this disclosure.

System architecture 100 comprises source computer 102, communications network 104, and target computer 106. In turn, source computer 102 comprises prioritized recovery of files during failback component 108, priority users 110, KVS 112, LRU list 114, protocol driver 116, message queue 118, priority-restore infrastructure component 120, and file system 122. And target computer comprises backup 124.

Figure 12:
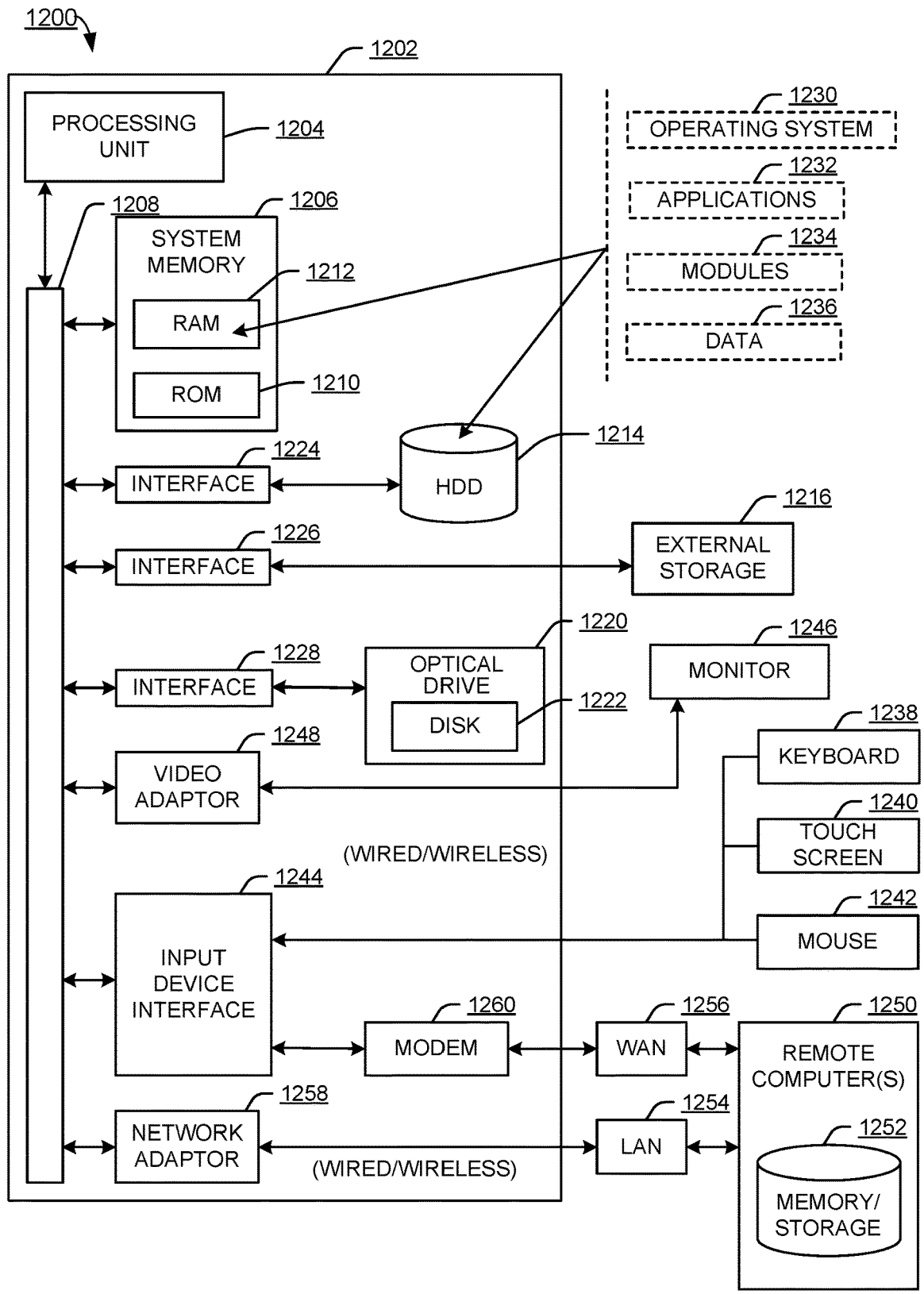
FIG. 12 illustrates an example block diagram of a computer operable to execute an embodiment of this disclosure.

Each of source computer 102 and/or target computer 106 can be implemented with part(s) of computing environment 1200 of FIG. 12. Communications network 104 can comprise a computer communications network, such as the Internet.

Priority users 110 can comprise a list (or other data store) or user accounts that have been deemed important, so files that they modify should be prioritized in performing data backup and recovery operations. KVS 112 can comprise a KVS as described herein, and which can maintain information about priority files. LRU list 114 can comprise a LRU list as described herein, and which can maintain information about priority files.

Protocol driver 116 can comprise a file system protocol driver that is configured to perform file system operations on file system 122. Protocol driver 116 can be configured to send information about work items relating to priority files to priority-restore infrastructure component 120 via message queue 118. File system 122 can store computer data as files, and be backed up. Backup 124 can comprise a remote backup of at least part of file system 122 (where backup 124 is stored on target computer 106 while file system 122 is stored on source computer 102).

Prioritized recovery of files during failback component 108 can facilitate identifying files of file system 122 as priority files, and prioritizing processing those files during data backup and recovery operations. In some examples, prioritized recovery of files during failback component 108 can implement part(s) of the process flows of FIGS. 4 and/or 8-11 to implement prioritized recovery of files during failback.

It can be appreciated that system architecture 100 is one example system architecture for prioritized recovery of files during failback, and that there can be other system architectures that facilitate prioritized recovery of files during failback.

FIG. 2 illustrates an example system architecture 200 of a key-value store, and that can facilitate prioritized recovery of files during failback, in accordance with an embodiment of this disclosure. In some examples, part(s) of system architecture 200 can be used to implement part(s) of system architecture 100 of FIG. 1 to facilitate prioritized recovery of files during failback.

System architecture 200 comprises KVS 202 and prioritized recovery of files during failback component 208 (which can be similar to prioritized recovery of files during failback component 108 of FIG. 1). In turn, KVS 202 comprises two columns-GFID 204 and LRU item 206.

Pairs of entries of GFID 204 and LRU item 206 can be stored in KVS 202. Using a GFID as a key, a corresponding LRU item can be identified, and then this LRU item can be identified in an LRU list, like LRU list 302 of FIG. 3. In this manner, specific LRU items in a LRU item can be accessed, where, in some examples, KVS 202 can be considered to be an index of LRU list 302 of FIG. 3.

In some examples, KVS 202 can be similar to KVS 112 of FIG. 1.

Figure 3:
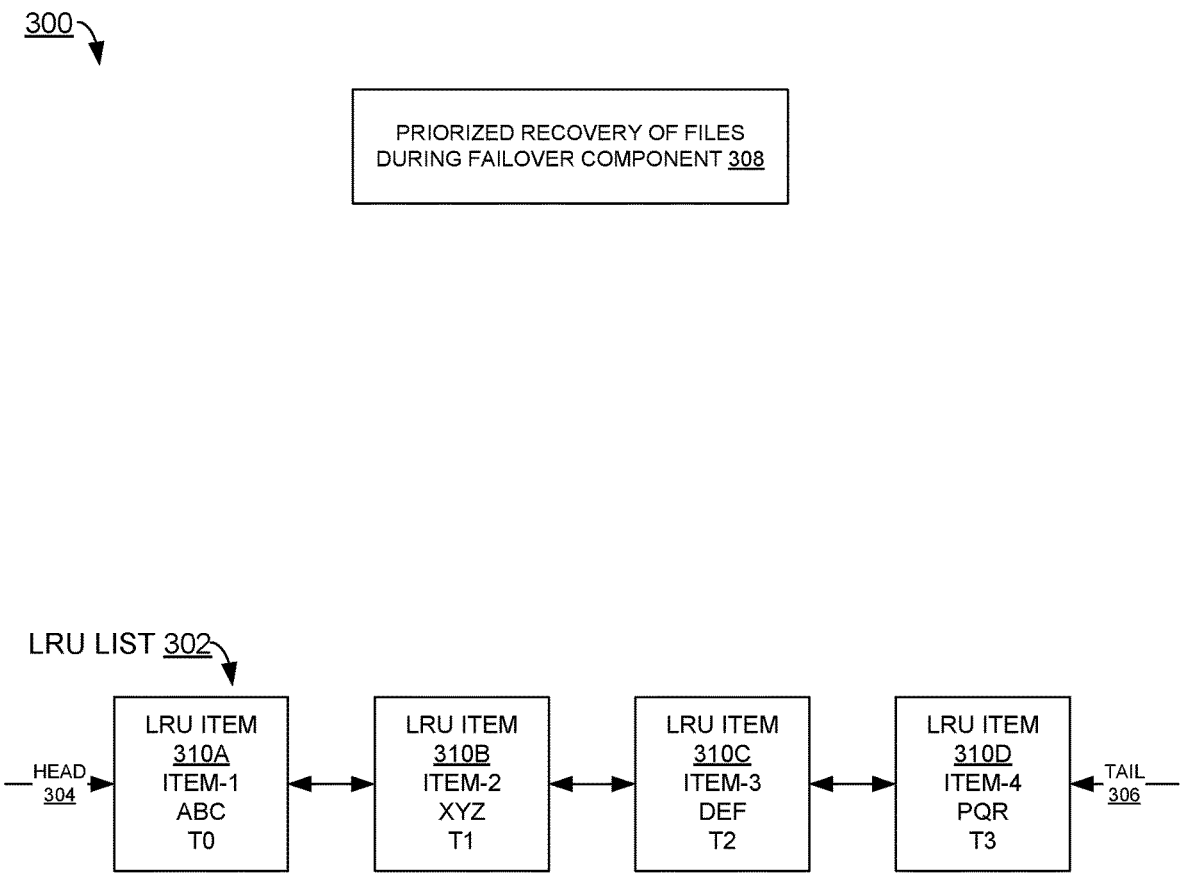
FIG. 3 illustrates an example system architecture of a least-recently-used list, and that can facilitate prioritized recovery of files during failback, in accordance with an embodiment of this disclosure.

FIG. 3 illustrates an example system architecture 300 of a least-recently-used list, and that can facilitate prioritized recovery of files during failback, in accordance with an embodiment of this disclosure. In some examples, part(s) of system architecture 300 can be used to implement part(s) of system architecture 100 of FIG. 1 to facilitate prioritized recovery of files during failback.

System architecture 300 comprises LRU list 302 and prioritized recovery of files during failback component 308 (which can be similar to prioritized recovery of files during failback component 108 of FIG. 1). In turn, LRU list comprises head 304, tail 306, LRU item 310A, LRU item 310B, LRU item 310C, and LRU item 310D.

Head 304 can identify a start point of LRU list 302-a LRU item pointed to by head 304 (here, LRU item 310A) can be the LRU item of LRU list 302 that corresponds a file that has most recently been accessed (or some other metric relating to a chronological order). Similarly, tail 306 can identify an endpoint of LRU list 302-a LRU item pointed to by tail 306 (here, LRU item 310D) can be the LRU item of LRU list 302 that corresponds a file that has least recently been accessed (or some other metric relating to a chronological order).

Each of LRU item 310A, LRU item 310B, LRU item 310C, and LRU item 310D can comprise a LRU item as described herein.

In some examples, each LRU item can identify a name (or other identifier) of the LRU item itself, a GUID for a file, and a time at which that file was most recently modified by a priority user (to use one example). Taking the example of LRU item 310A, the name of the LRU item is Item-1, the GUID is ABC, and the time is T0.

In some examples, LRU list 302 can be similar to LRU list 114 of FIG. 1.

Example Process Flow

Figure 4:
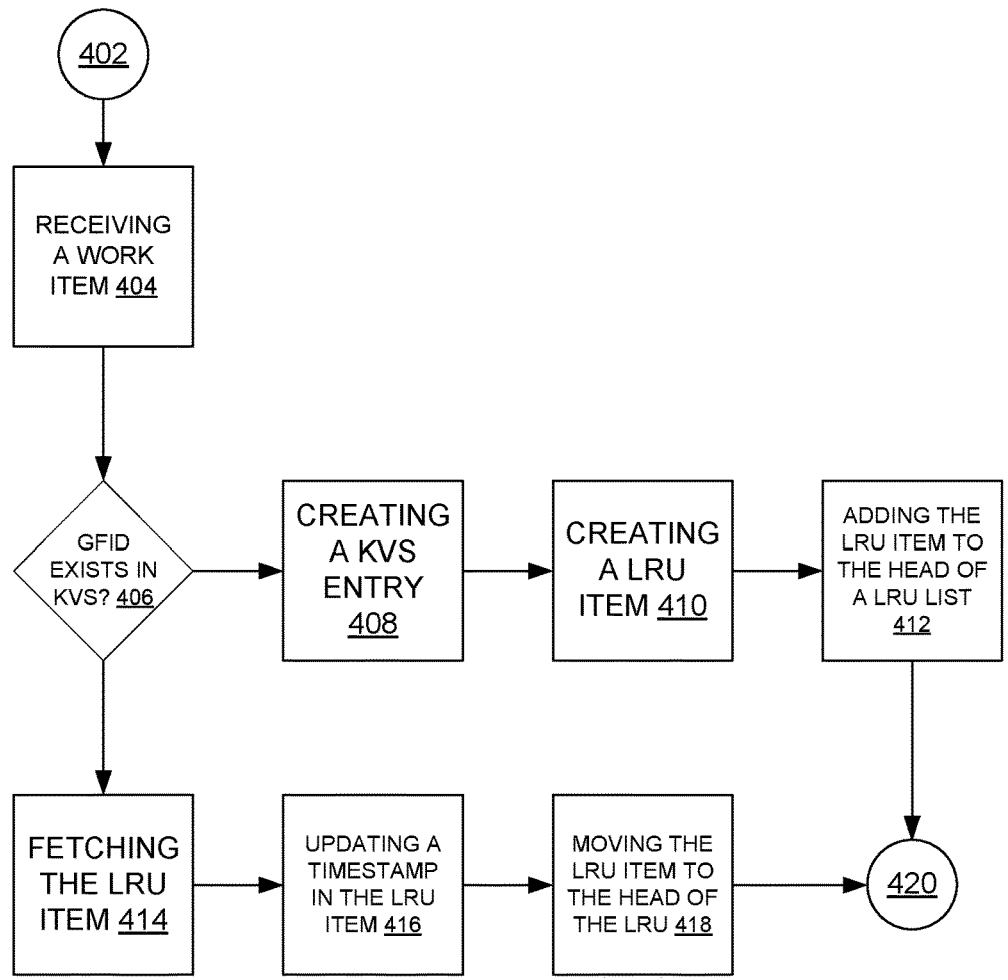
FIG. 4 illustrates an example process flow that can facilitate prioritized recovery of files during failback, in accordance with an embodiment of this disclosure.

FIG. 4 illustrates an example process flow 400 that can facilitate prioritized recovery of files during failback, in accordance with an embodiment of this disclosure. In some examples, one or more embodiments of process flow 400 can be implemented by prioritized recovery of files during failback component 108 of FIG. 1, or computing environment 1200 of FIG. 12.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 800 of FIG. 8, process flow 900 of FIG. 9, process flow 1000 of FIG. 10, and/or process flow 1100 of FIG. 11.

Process flow 400 begins with 402, and moves to operation 404.

Process flow 400 begins with 402, and moves to 404.

Operation 404 depicts receiving a work item. This can be a work item that identifies that an important user has performed a modification on a file that is identified by the work item (such as with a GUID).

After operation 404, process flow 400 moves to operation 406.

Operation 406 depicts determining whether the GFID exists in a KVS. This can be the GFID from the work item in operation 404, and the KVS can be similar to KVS 202, KVS 202 can be checked to determine whether a GFID of GFID 204 matches the GFID of operation 404.

Where it is determined in operation 406 that the GFID exists in the KVS, then process flow 400 moves to operation 414. Instead, it is determined in operation 406 that the GFID does not exist in the KVS, then process flow 400 moves to operation 408.

Operation 408 is reached from operation 406 where it is determined that the GFID does not exist in the KVS. Operation 408 depicts creating a KVS entry. This can comprise creating an entry comprising a GFID and an identifier of a LRU item (that also identifies the file referenced in the work item) in the KVS from operation 406.

After operation 408, process flow 400 moves to operation 410.

Operation 410 depicts creating an LRU item. This can be a LRU item that corresponds to the KVS entry of operation 408 (e.g., they both identify the same GUID), and the LRU item can be similar to LRU item 310A of FIG. 3.

After operation 410, process flow 400 moves to operation 412.

Operation 412 depicts adding the LRU item to the head of an LRU list. Continuing with the example of FIG. 3, this can comprise adding a LRU item (e.g., LRU item 310A) to a position in LRU list 302 that is identified by head 304.

In this manner, operations 408-412 can be implemented to add an identification of a file that has been modified by a priority user to both a KVS and a LRU list, where the KVS and LRU list can be used to facilitate prioritized recovery of files during failback.

Operation 414 is reached from operation 406 where it is determined that the GFID exists in the KVS. Operation 414 depicts fetching the LRU item. This can comprise using the GUID from operation 404 as a key to the KVS of operation 406 to determine a corresponding LRU item, and accessing that LRU item in an LRU list.

After operation 414, process flow 400 moves to operation 416.

Operation 416 depicts updating a timestamp in the LRU item. A timestamp can identify a most recent time at which the corresponding file was modified by a priority user (or that the timestamp itself is being updated in operation 416, as a result of the file being modified by the priority user). To update the timestamp can indicate that the corresponding file has been modified by a priority user, which itself can be indicated by the work item of operation 404.

After operation 416, process flow 400 moves to operation 418.

Operation 418 depicts moving the LRU item to the head of the LRU. Using the example of FIG. 3, this can comprise moving an existing LRU item (the existence of the GFID in the KVS in operation 406 can indicate that there is a corresponding LRU item that exists) from its current position to the head of LRU list 302 as indicated by head 304. Where a LRU list is implemented using a doubly-linked list (e.g., an LRU item can have data that points both to an item in front of it in the LRU list and behind it, should the item not be at the head or tail of the LRU list), this can comprise updating those links in one or more LRU items to reflect the new ordering of LRU items in LRU list 302.

After operation 418, process flow 400 moves to 420, where process flow 400 ends.

Operations 414-418 can be implemented to effectuating updating the order of a LRU list when a file that corresponds to the work item of operation 404 already has a LRU item in the LRU list. This updating of the order can comprise indicating that the file is now the most-recently updated file referenced by the LRU list.

Example Architectures

Figure 5:
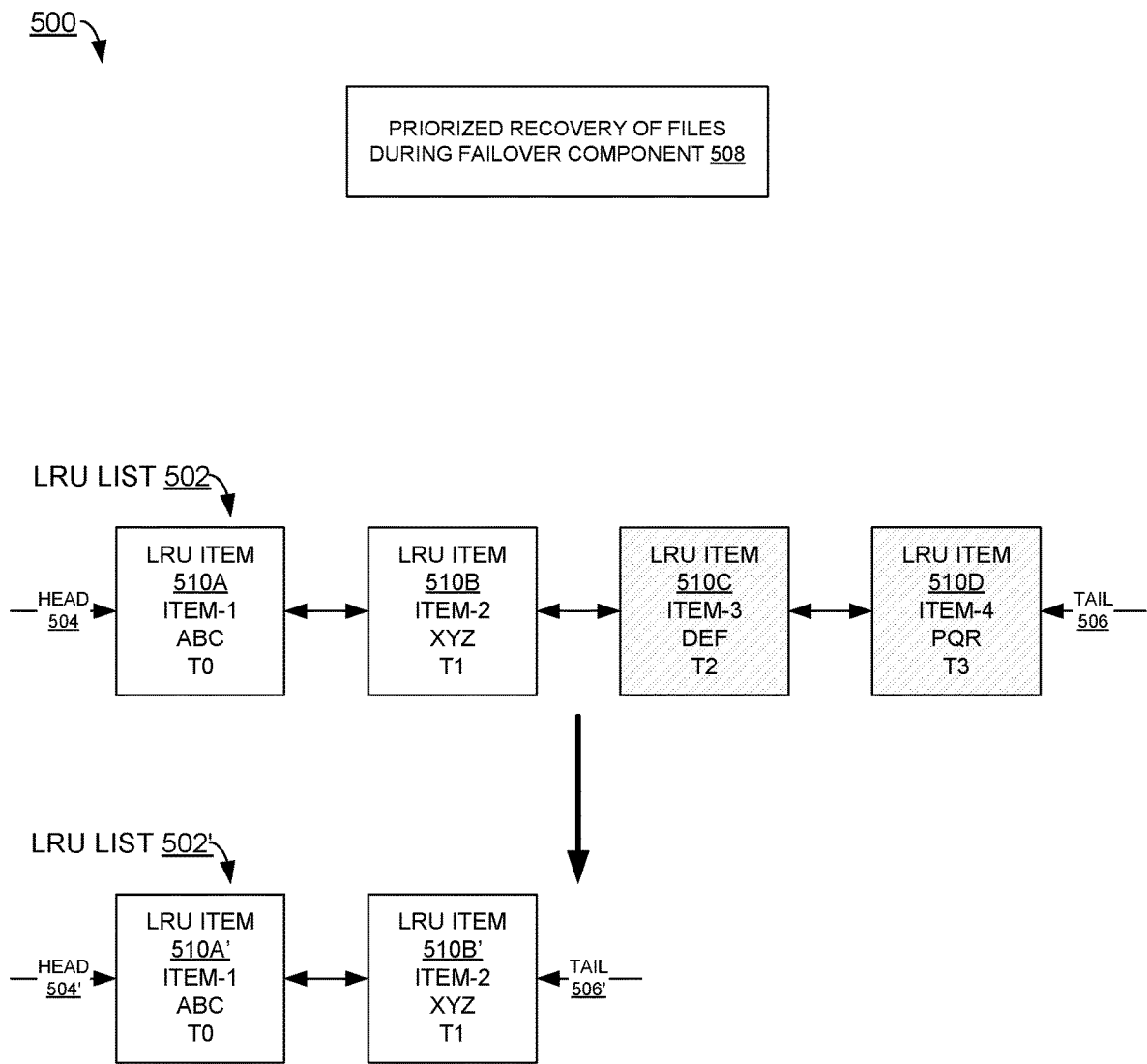
FIG. 5 illustrates an example system architecture for trimming a least-recently-used list, and that can facilitate prioritized recovery of files during failback, in accordance with an embodiment of this disclosure.

FIG. 5 illustrates an example system architecture 500 for trimming a least-recently-used list, and that can facilitate prioritized recovery of files during failback, in accordance with an embodiment of this disclosure. In some examples, part(s) of system architecture 500 can be used to implement part(s) of system architecture 100 of FIG. 1 to facilitate prioritized recovery of files during failback.

System architecture 500 comprises LRU list 502, LRU list 502', and prioritized recovery of files during failback component 508 (which can be similar to prioritized recovery of files during failback component 108 of FIG. 1).

LRU list 502' can comprise a version of LRU list 502 after prioritized recovery of files during failback component 508 after trimming LRU list 502 to remove sufficiently old entries.

LRU list 502 comprises head 504, tail 506, LRU item 510A, LRU item 510B, LRU item 510C, and LRU item 510D (which can be similar to head 304, tail 306, LRU item 310A, LRU item 310B. LRU item 310C, and LRU item 310D, respectively, of FIG. 3).

LRU list 502' comprises head 504', tail 506', LRU item 510A', and LRU item 510B' (which can be similar to head 504, tail 506, LRU item 510A, and LRU item 510B, respectively).

The timestamps of the LRU items of LRU list 502 are T0, T1, T2, and T3, and it can be that those are ordered—that is, T0 is more recent than T1, which is more recent than T2, which is more recent than T3.

As depicted in system architecture 500, the trimming is based on a threshold time that is older than T2, but more recent than T3. As such, LRU item 510A and LRU item 510B are preserved in LRU list 502' (as LRU item 510A' and LRU item 510B'), while LRU item 510A and LRU item 510B are not.

Figure 6:
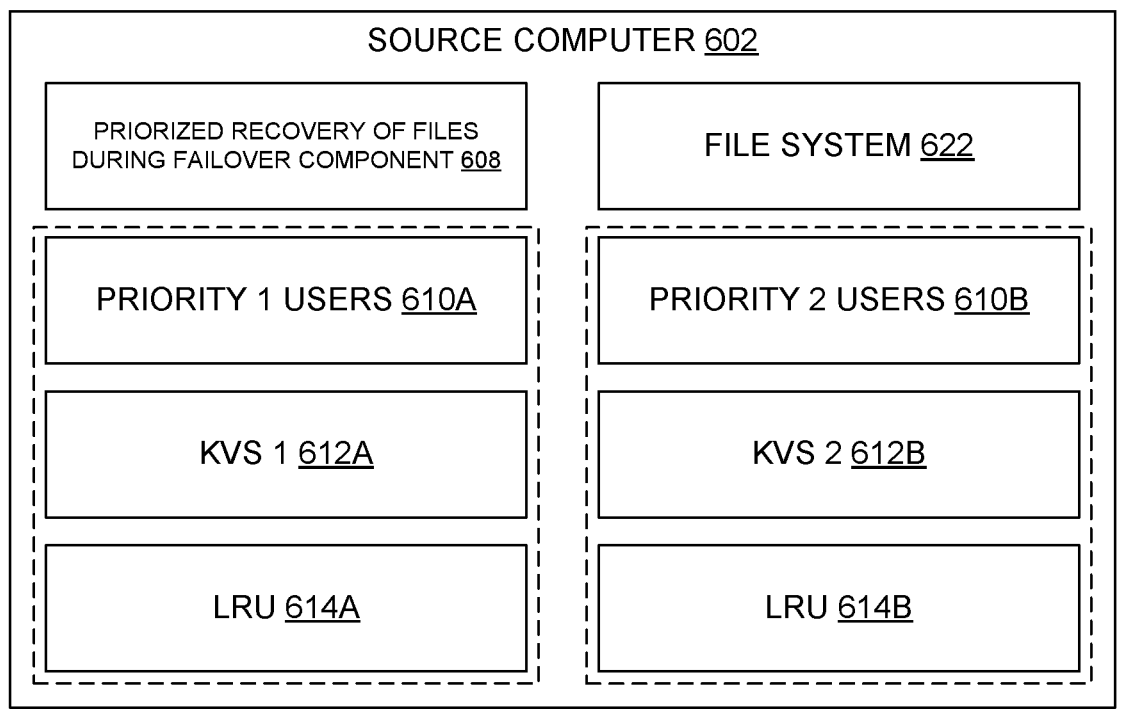
FIG. 6 illustrates an example system architecture for using multiple priorities, and that can facilitate prioritized recovery of files during failback, in accordance with an embodiment of this disclosure.

FIG. 6 illustrates an example system architecture 600 for using multiple priorities, and that can facilitate prioritized recovery of files during failback, in accordance with an embodiment of this disclosure. In some examples, part(s) of system architecture 600 can be used to implement part(s) of system architecture 100 of FIG. 1 to facilitate prioritized recovery of files during failback.

System architecture 600 comprises server 602 (which can be similar to source computer 102 of FIG. 1), prioritized recovery of files during failback component 608 (which can be similar to prioritized recovery of files during failback component 108), priority 1 users 610A, priority 2 users 610B. KVS 1 612A, KVS 2 612B, LRU 614A, LRU 614B, and file system 622. Each of priority 1 users 610A and priority 2 users 610B can be similar to a different instance of priority users 610. Each of KVS 1 612A and KVS 2 612B can be similar to a different instance of KVS 112. Each of LRU list 1 614A and LRU list 2 614B can be similar to a different instance of LRU list 114. File system 622 can be similar to file system 122.

There can be examples where there are multiple different priorities are maintained for file modifications—e.g., there is one group of users for whom files are recovered at a higher priority, a second group of users for whom files are recovered at a lower (but still elevated), and then the remaining files that are recovered at a normal priority.

To effectuate this, separate lists of priority users, KVSes, and LRU lists can be maintained for each priority. That is, priority 1 users 610A, KVS 1 612A, and LRU list 1 614A can correspond to one recovery priority of files of file system 622, and priority 2 users 610B. KVS 2 612B, and LRU list 2 614B can correspond to another recovery priority of files of file system 622.

Figure 7:
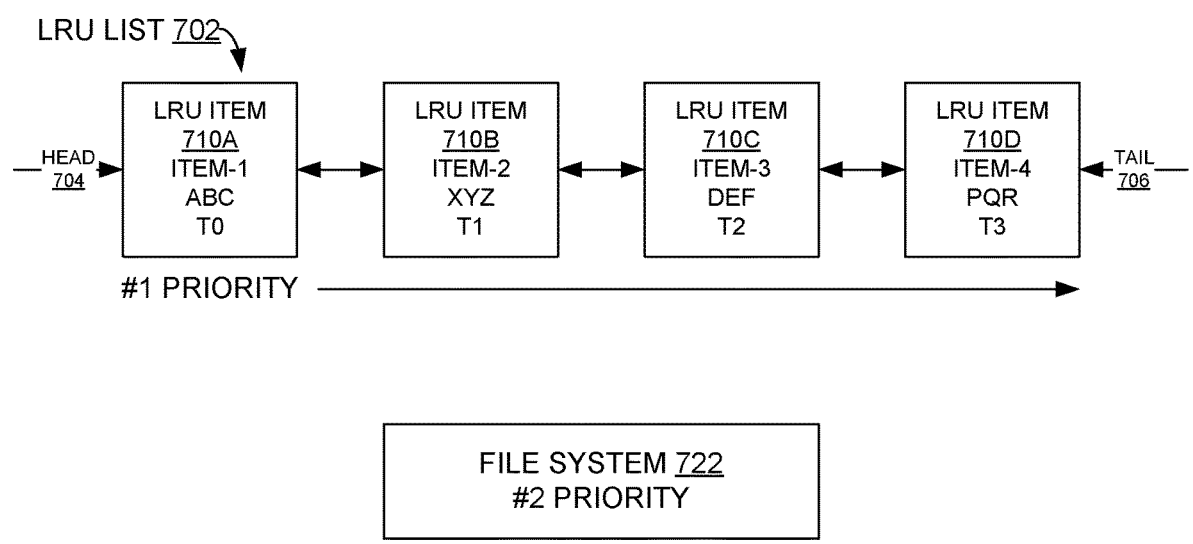
FIG. 7 illustrates an example system architecture for backing up files, and that can facilitate prioritized recovery of files during failback, in accordance with an embodiment of this disclosure.

FIG. 7 illustrates an example system architecture 700 for backing up files, and that can facilitate prioritized recovery of files during failback, in accordance with an embodiment of this disclosure. In some examples, part(s) of system architecture 700 can be used to implement part(s) of system architecture 100 of FIG. 1 to facilitate prioritized recovery of files during failback.

System architecture 700 comprises LRU list 702, head 704, tail 706, LRU item 710A, LRU item 710B. LRU item 710C, and LRU item 710D (which can be similar to LRU list 302, head 304, tail 306, LRU item 310A, LRU item 310B, LRU item 310C, and LRU item 310D of FIG. 3, respectively). System architecture 700 also comprises prioritized recovery of files during failback component 708 (which can be similar to prioritized recovery of files during failback component 108 of FIG. 1), and file system 722 (which can be similar to file system 122).

In backing up (or performing another type of data protection operation on) files in system architecture 700, first this operation can be performed on files identified by LRU list 702, starting at head 704 and moving toward tail 706. After the files of LRU list 702 have been processed, then those files that are in file system 722 (and identified by the operation), excluding the files already processed because they are identified by LRU list 702, can be processed.

In this manner, a prioritized recovery of files during failback can be effectuated.

Example Process Flows

Figure 8:
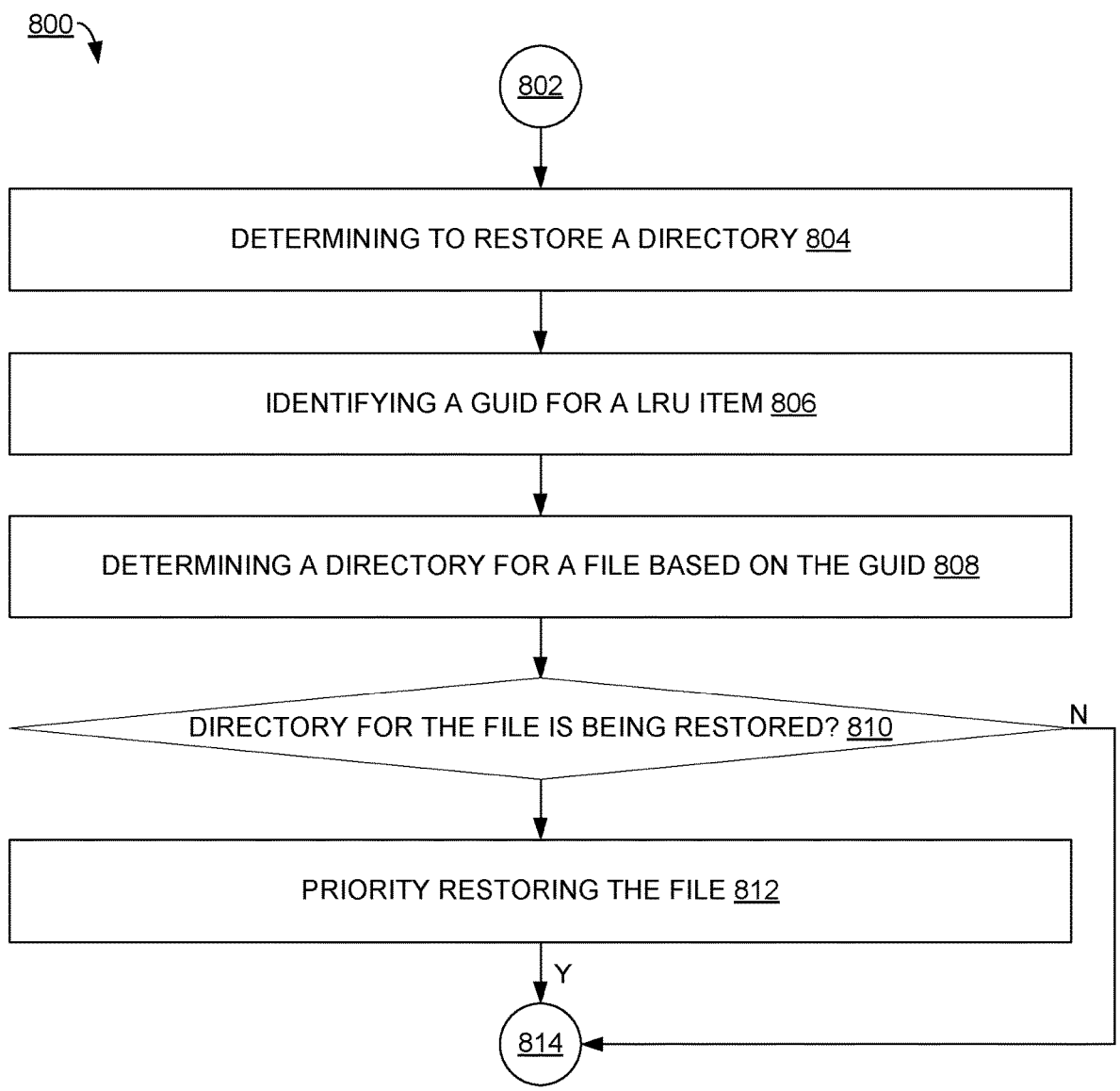
FIG. 8 illustrates an example process flow for restoring files, and that can facilitate prioritized recovery of files during failback, in accordance with an embodiment of this disclosure.

FIG. 8 illustrates an example process flow 800 for restoring files, and that can facilitate prioritized recovery of files during failback, in accordance with an embodiment of this disclosure. In some examples, one or more embodiments of process flow 800 can be implemented by prioritized recovery of files during failback component 108 of FIG. 1, or computing environment 1200 of FIG. 12.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 400 of FIG. 4, process flow 900 of FIG. 9, process flow 1000 of FIG. 10, and/or process flow 1100 of FIG. 11.

Process flow 800 begins with 802, and moves to operation 804.

Operation 804 depicts determining to restore a directory. This can comprise receiving a request from a user account to perform a restore operation, where the request identifies the directory being restored. Using the example of FIG. 1, this can be a restore from part of backup 124 of target computer 106 to file system 122 of source computer 102.

After operation 804, process flow 800 moves to operation 806.

Operation 806 depicts identifying a GUID for an LRU item. Using the example of FIG. 3, this can comprise accessing LRU item 310A of LRU list 302 to identify a GUID stored in LRU item 310A. This will be a GUID for a priority file.

In some examples, operations 806-812 can be performed for each LRU item in a LRU list to determine if there are any files in the directory that should be priority restored.

After operation 806, process flow 800 moves to operation 808.

Operation 808 depicts determining a directory for a file based on the GUID. In some examples, a GUID can be used to determine a file name, and the file name comprises a full path to the file, so also contains the directory that the file is stored in.

After operation 808, process flow 800 moves to operation 810.

Operation 810 depicts determining if the directory for the file is being restored. This can comprise determining if the directory for the file identified in operation 808 is the same as the directory being restored from operation 804.

Where in operation 810 it is determined that the directory for the file is being restored, process flow 800 moves to operation 812. Instead, where in operation 810 it is determined that the directory for the file is not being restored, process flow 800 moves to 814, where process flow 800 ends.

Operation 812 is reached from operation 810 where it is determined that the directory for the file is being restored. Operation 810 depicts priority restoring the file. That is, a priority file that is stored in the directory being restored can be restored before non-priority files in that directory.

After operation 812, process flow 800 moves to 814, where process flow 800 ends.

Figure 9:
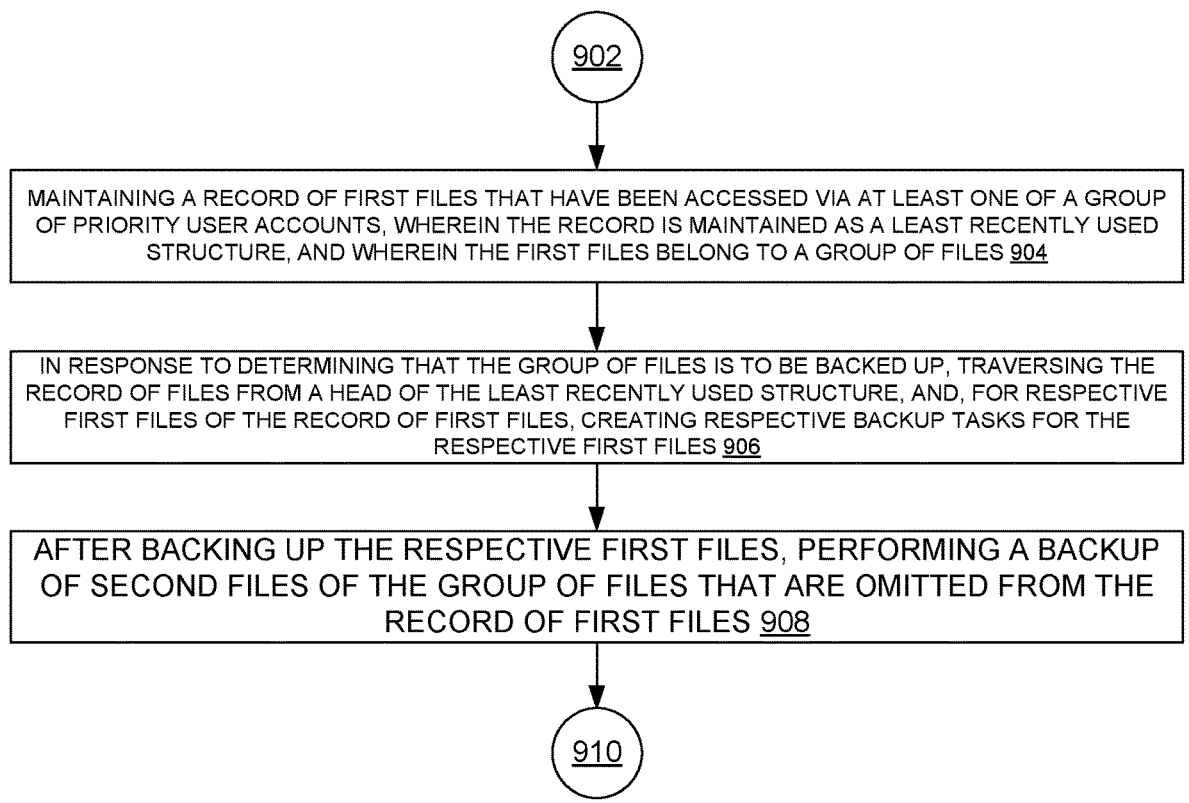
FIG. 9 illustrates another example process flow that can facilitate prioritized recovery of files during failback, in accordance with an embodiment of this disclosure.

FIG. 9 illustrates another example process flow 900 that can facilitate prioritized recovery of files during failback, in accordance with an embodiment of this disclosure. In some examples, one or more embodiments of process flow 900 can be implemented by prioritized recovery of files during failback component 108 of FIG. 1, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 400 of FIG. 4, process flow 800 of FIG. 8, process flow 1000 of FIG. 10, and/or process flow 1100 of FIG. 11.

Process flow 900 begins with 902, and moves to operation 904.

Operation 904 depicts maintaining a record of first files that have been accessed via at least one of a group of priority user accounts, wherein the record is maintained as a least recently used structure, and wherein the first files belong to a group of files. In some examples, the record can be similar to LRU list 114 of FIG. 1, which identifies files of file system 122.

In some examples, operation 904 comprises, in response to determining that a user account has been added to the group of priority user accounts, sending a SIGHUP signal to a protocol driver that is configured to process file operations, and wherein the protocol driver is configured to reconfigure a configuration to identify the user account as belonging to the group of priority user accounts. In some examples, the protocol driver is further configured to persist the configuration, and propagate the configuration to memory. That is, an administrator can mark a user as being important. When this occurs, a corresponding SIGHUP can be sent to one or more protocol drivers, that can reconfigure a config, persist the config, and also propagate the config to memory.

In some examples, operation 904 comprises maintaining the least recently used structure, wherein respective least recently used entries of the least recently used structure comprise respective file identifiers and respective time stamps that indicate respective times at which the respective first files, that correspond to the respective file identifiers, were last accessed by the group of priority user accounts. This can be similar to LRU list 302 of FIG. 3.

In some examples, operation 904 comprises maintaining the record of first files comprises maintaining a key value store that comprises pairs, and wherein respective pairs of the pairs comprise the respective file identifiers and respective identifiers of the respective least recently used entries. This can be similar to KVS 202 of FIG. 2.

In some examples, operation 904 comprises, in response to a completion callback for a file operation of the file operations for a first file of the group of files, and in response to determining that a first user account that is associated with the file operation belongs to the group of priority user accounts, determining whether a file identifier for the first file exists in a key value store of the record of first files, and in response to determining that the file identifier for the first file does not exist in the key value store, creating a first entry for the first file in the key value store, creating a second entry for the first file for the least recently used structure, and adding the second entry to the head of the least recently used structure. That is, operations similar to operations 404-412 can be performed.

In some examples, operation 904 comprises, in response to a completion callback for a file operation of the file operations for a first file of the group of files, and in response to determining that a first user account that is associated with the file operation belongs to the group of priority user accounts, determining whether a file identifier for the first file exists in a key value store of the record of first files, in response to determining that the file identifier for the first file does exists in the key value store, fetching an entry for the first file for the least recently used structure, updating a timestamp of the entry based on a time that corresponds to the file operation, and moving the entry to the head of the least recently used structure. That is, operations similar to operations 404-406 and 414-418 can be performed.

After operation 904, process flow 900 moves to operation 906.

Operation 906 depicts, in response to determining that the group of files is to be backed up, traversing the record of files from a head of the least recently used structure, and, for respective first files of the record of first files, creating respective backup tasks for the respective first files. In some examples, this can be similar to performing a backup of files that are identified in LRU list 714 of FIG. 7 as part of first backing up those files before backing up other files.

After operation 906, process flow 900 moves to operation 908.

Operation 908 depicts, after backing up the respective first files, performing a backup of second files of the group of files that are omitted from the record of first files. Continuing with the example of FIG. 7, this can be similar to performing a backup of other files in file system 722 after having performed a backup of files that are identified in LRU list 714.

After operation 908, process flow 900 moves to 910, where process flow 900 ends.

Figure 10:
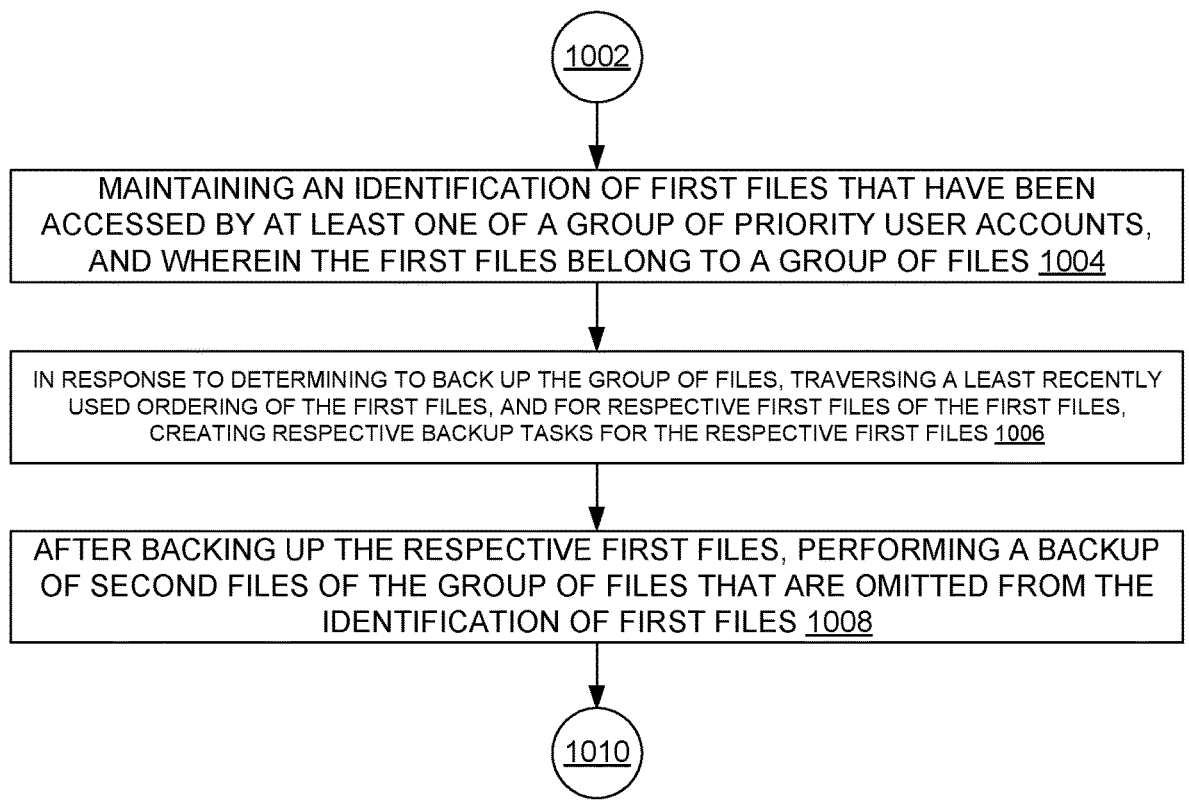
FIG. 10 illustrates another example process flow that can facilitate prioritized recovery of files during failback, in accordance with an embodiment of this disclosure.

FIG. 10 illustrates another example process flow 1000 that can facilitate prioritized recovery of files during failback, in accordance with an embodiment of this disclosure. In some examples, one or more embodiments of process flow 1000 can be implemented by prioritized recovery of files during failback component 108 of FIG. 1, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 400 of FIG. 4, process flow 800 of FIG. 8, process flow 900 of FIG. 9, and/or process flow 1100 of FIG. 11.

Process flow 1000 begins with 1002, and moves to operation 1004.

Operation 1004 depicts maintaining an identification of first files that have been accessed by at least one of a group of priority user accounts, and wherein the first files belong to a group of files. In some examples, operation 1004 can be implemented in a similar manner as operation 904 of FIG. 9.

After operation 1004, process flow 1000 moves to operation 1006.

Operation 1006 depicts, in response to determining to back up the group of files, traversing a least recently used ordering of the first files, and for respective first files of the first files, creating respective backup tasks for the respective first files. In some examples, operation 1006 can be implemented in a similar manner as operation 906 of FIG. 9.

After operation 1006, process flow 1000 moves to operation 1008.

Operation 1008 depicts, after backing up the respective first files, performing a backup of second files of the group of files that are omitted from the identification of first files. In some examples, operation 1008 can be implemented in a similar manner as operation 908 of FIG. 9.

In some examples, operation 1008 comprises maintaining respective first file identifiers of the respective first files as part of backing up the respective first files, and identifying respective second files of the second files based on determining that respective second file identifiers of the second files differ from the respective first file identifiers. That is, an LRU list can first be traversed to back up the files identified in that list. GFIDs of those files can be preserved so that the same file is not processed twice as part of backing up non-priority files.

In some examples, operation 1008 comprises maintaining a second identification of third files for priority backup, wherein the group of files comprises the third files, and, in response to determining to back up the group of files, backing up the third files before performing the backup of the second files of the group of files, wherein the second files are omitted from the third files. In some examples, a first backup priority associated with the first files is greater than a second backup priority associated with the third files, operation 1008 comprises performing the backing up of the third files after backing up the respective first files. That is, multiple priorities can be maintained for different groups of users, such as depicted with respect to FIG. 6.

In some examples, the identification of the first files comprises respective time stamps of the respective first files, the respective stamps indicate respective times at which the respective first files were most-recently accessed by a priority user account, and operation 1008 comprises, at a scheduled time, removing from the identification of the first files, respective old files of the first files that have respective old time stamps of the time stamps that are older than a threshold age criterion. That is, an LRU job can run on a scheduled time and check whether an LRU item's time stamp is old enough to indicate removing the item from the LRU list. This can be similar to as depicted in FIG. 5.

In some examples, the identification of the first files is maintained in a least-recently used ordering, and removing, from the identification of the first files, the respective old files comprises traversing the identification of the first files from an end of the least-recently used ordering. That is, using the example of FIG. 5, trimming old LRU items can be performed starting at the LRU list's tail (e.g., tail 506).

In some examples, operation 1008 comprises maintaining a key-value store that identifies the first files, and removing, from the identification of the first files, the respective old files comprises removing respective entries of the key-value store that correspond to the respective old files. That is, when an LRU item is removed, as in FIG. 5, a corresponding KVS entry can be removed, as well.

In some examples, removing the respective entries of the key-value store comprises identifying the respective entries based on the respective entries comprising respective first file identifiers that match respective second file identifiers of the respective old files. That is, the corresponding KVS entry can be removed based on it storing a same GFID as the LRU item being removed.

After operation 1008, process flow 1000 moves to 1010, where process flow 1000 ends.

Figure 11:
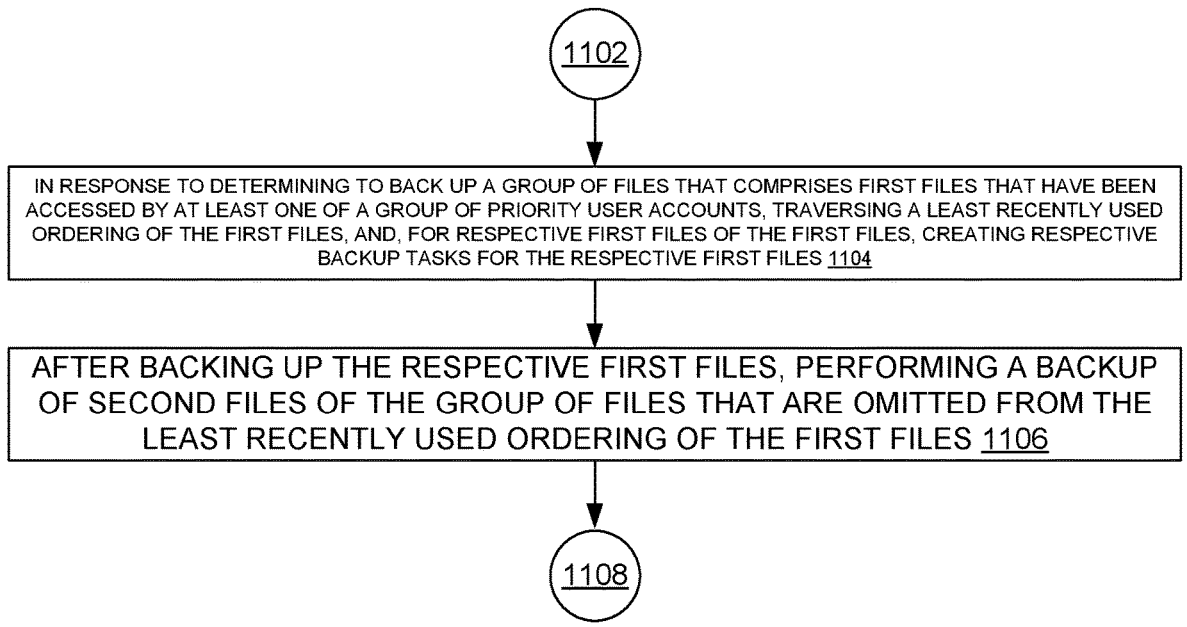
FIG. 11 illustrates another example process flow that can facilitate prioritized recovery of files during failback, in accordance with an embodiment of this disclosure.

FIG. 11 illustrates another example process flow 1100 that can facilitate prioritized recovery of files during failback, in accordance with an embodiment of this disclosure. In some examples, one or more embodiments of process flow 1100 can be implemented by prioritized recovery of files during failback component 108 of FIG. 1, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 400 of FIG. 4, process flow 800 of FIG. 8, process flow 900 of FIG. 9, and/or process flow 1000 of FIG. 10.

Process flow 1100 begins with 1102, and moves to operation 1104.

Operation 1104 depicts, in response to determining to back up a group of files that comprises first files that have been accessed by at least one of a group of priority user accounts, traversing a least recently used ordering of the first files, and for respective first files of the first files, creating respective backup tasks for the respective first files. In some examples, operation 1104 can be implemented in a similar manner as operations 904-906 of FIG. 9.

In some examples, operation 1104 can comprise, based on determining that a completion callback for a file operation has occurred, and in response to determining that a user account that requested that the file operation be performed is a member of the group of priority user accounts, enqueuing a work item to a message queue, wherein the work item indicates updating the least recently used ordering of the first files based on the file operation. This can be similar to generating a work item and enqueuing it in message queue 118 of FIG. 1.

In some examples, the completion callback is a first completion callback, the file operation is a first file operation, the use account is a first user account, and the work item is a first work item. In such examples, operation 1104 can comprise, based on determining that a second completion callback for a second file operation has occurred, and in response to determining that a second user account that requested that the second file operation be performed is not a member of the group of priority user accounts, refraining from enqueuing a second work item to the message queue. That is, where a user is not designated as important, it can be that the steps of enqueuing a work item is omitted.

In some examples, the completion callback is a first completion callback, the file operation is a first file operation that comprises a write operation or a modify operation, and the work item is a first work item. In such examples, operation 1104 can comprise, based on determining that a second completion callback for a second file operation has occurred, wherein the second file operation comprises a read operation, refraining from enqueuing a second work item to the message queue. That is, it can be that enqueuing a work item is performed for specific types of file operations (e.g., write or modify) and not for others (e.g., read).

After operation 1104, process flow 1100 moves to operation 1106.

Operation 1106 depicts, after backing up the respective first files, performing a backup of second files of the group of files that are omitted from the least recently used ordering of the first files. In some examples, operation 1106 can be implemented in a similar manner as operation 908 of FIG. 9.

In some examples, operation 1106 comprises, after backing up the second files, and in response to determining to restore a directory of files of the group of files, determining a file identifier of a first file of the first files, wherein the file identifier differs from a file name, determining the file name based on the file identifier, and restoring the first file based on determining that the first file is a member of the directory based on the file name. That is, when restoring for a particular directory, a GFID can be used to fetch a file name, and thus, a directory name.

After operation 1106, process flow 1100 moves to 1108, where process flow 1100 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of source computer 102 and/or target computer 106 of FIG. 1.

In some examples, computing environment 1200 can implement one or more embodiments of the process flows of FIGS. 4 and/or 8-11 to facilitate prioritized recovery of files during failback.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a nonvolatile storage such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples, and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache." and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    at least one processor; and
    at least one memory that stores executable instructions that, when executed by the at least one processor, facilitate performance of operations, comprising:
        maintaining a record of first files that have been accessed via at least one of a group of priority user accounts, wherein the record is maintained as a least recently used structure, wherein the first files belong to a group of files, wherein the record of the first files comprises respective time stamps of the respective first files, and wherein the respective time stamps indicate respective times at which the respective first files were most-recently accessed via a priority user account of the group of priority user accounts;
        in response to determining that the group of files is to be backed up, traversing the record of files from a head of the least recently used structure, and, for respective first files of the record of first files, creating respective backup tasks for the respective first files;
        after backing up the respective first files, performing a backup of second files of the group of files that are omitted from the record of first files; and
        at a scheduled time,
            removing, from the record of the first files, respective old files of the first files that have respective old time stamps of the time stamps that are older than a threshold age, and
            removing respective entries of a key value store that correspond to the respective old files.

2. The system of claim 1, wherein maintaining the record of first files comprises maintaining the least recently used structure, wherein respective least recently used entries of the least recently used structure comprise respective file identifiers and respective time stamps that indicate respective times at which the respective first files, that correspond to the respective file identifiers, were last accessed by the group of priority user accounts.

3. The system of claim 2, wherein the key value store comprises pairs, and wherein respective pairs of the pairs comprise the respective file identifiers and respective identifiers of the respective least recently used entries.

4. The system of claim 1, wherein the operations further comprise:
in response to determining that a user account has been added to the group of priority user accounts, sending a SIGHUP signal to a protocol driver that is configured to process file operations, and wherein the protocol driver is configured to reconfigure a configuration to identify the user account as belonging to the group of priority user accounts.

5. The system of claim 4, wherein the protocol driver is further configured to persist the configuration, and propagate the configuration to memory.

6. The system of claim 4, wherein the operations comprise:
in response to a completion callback for a file operation of the file operations for a first file of the group of files, and in response to determining that a first user account that is associated with the file operation belongs to the group of priority user accounts, determining whether a file identifier for the first file exists in the key value store; and
in response to determining that the file identifier for the first file does not exist in the key value store,
creating a first entry for the first file in the key value store,
creating a second entry for the first file for the least recently used structure, and
adding the second entry to the head of the least recently used structure.

7. The system of claim 4, wherein the operations comprise:
in response to a completion callback for a file operation of the file operations for a first file of the group of files, and in response to determining that a first user account that is associated with the file operation belongs to the group of priority user accounts, determining whether a file identifier for the first file exists in the key value store; and
in response to determining that the file identifier for the first file does exists in the key value store,
fetching an entry for the first file for the least recently used structure,
updating a timestamp of the entry based on a time that corresponds to the file operation, and
moving the entry to the head of the least recently used structure.

8. The system of claim 1, wherein the operations further comprise:
based on determining that a completion callback for a file operation has occurred, and, in response to determining that a user account that requested that the file operation be performed is a member of the group of priority user accounts, enqueuing a work item to a message queue, wherein the work item indicates updating the least recently used structure based on the file operation.

9. A method, comprising:
maintaining, by a system comprising at least one processor, an identification of first files that have been accessed by at least one of a group of priority user accounts, wherein the first files belong to a group of files, wherein the identification of the first files comprises respective time stamps of the respective first files, and wherein the respective time stamps indicate respective times at which the respective first files were most-recently accessed via a priority user account of the group of priority user accounts;
in response to determining to back up the group of files,
traversing, by the system, a least recently used ordering of the first files, and
for respective first files of the first files, creating, by the system, respective backup tasks for the respective first files;
after backing up the respective first files, performing, by the system, a backup of second files of the group of files that are omitted from the identification of first files;
at a scheduled time, removing, by the system from the identification of the first files, respective old files of the first files that have respective old time stamps of the time stamps that are older than a threshold age specified by a threshold age criterion; and
maintaining, by the system, a key-value store that identifies the first files, wherein removing, from the identification of the first files, the respective old files comprises removing respective entries of the key-value store that correspond to the respective old files.

10. The method of claim 9, wherein performing the backup of the second files of the group of files that are omitted from the identification of first files comprises:
maintaining, by the system, respective first file identifiers of the respective first files as part of backing up the respective first files; and
identifying respective second files of the second files based on determining that respective second file identifiers of the second files differ from the respective first file identifiers.

11. The method of claim 10, wherein the identification of first files is a first identification, and further comprising:
maintaining, by the system, a second identification of third files for priority backup, wherein the group of files comprises the third files; and
in response to determining to back up the group of files, backing up, by the system, the third files before performing the backup of the second files of the group of files, wherein the second files are omitted from the third files.

12. The method of claim 11, wherein a first backup priority associated with the first files is greater than a second backup priority associated with the third files, and further comprising:
performing the backing up of the third files after backing up the respective first files.

13. The method of claim 9, wherein the identification of the first files is maintained in a least-recently used ordering, and wherein removing, from the identification of the first files, the respective old files further comprises:
traversing the identification of the first files from an end of the least-recently used ordering.

14. The method of claim 9, wherein removing the respective entries of the key-value store further comprises:
identifying the respective entries based on the respective entries comprising respective first file identifiers that match respective second file identifiers of the respective old files.

15. A non-transitory computer-readable medium comprising instructions that, in response to execution, cause a system comprising at least one processor to perform operations, comprising:
- in response to determining to back up a group of files that comprises first files that have been accessed by at least one of a group of priority user accounts, wherein a record of the first files is maintained as a least recently used structure, wherein the record of the first files comprises respective time stamps of the respective first files that indicate respective times at which the respective first files were most-recently accessed in connection with a priority user account of the group of priority user accounts,
  - traversing a least recently used ordering of the first files, and
  - for respective first files of the first files, creating respective backup tasks for the respective first files;
- after backing up the respective first files, performing, by the system, a backup of second files of the group of files that are omitted from the least recently used ordering of the first files; and
- at a scheduled time, removing, from the record of the first files, respective old files of the first files that have respective old time stamps of the time stamps that are determined to be older with reference to a threshold age criterion, and removing respective entries of a key value store that correspond to the respective old files.

16. The non-transitory computer-readable medium of claim 15, wherein the operations further comprise:
- after backing up the second files, and in response to determining to restore a directory of files of the group of files,
  - determining a file identifier of a first file of the first files, wherein the file identifier differs from a file name,
  - determining the file name based on the file identifier, and
  - restoring the first file based on determining that the first file is a member of the directory based on the file name.

17. The non-transitory computer-readable medium of claim 15, wherein the operations further comprise:
- based on determining that a completion callback for a file operation has occurred, and in response to determining that a user account that requested that the file operation be performed is a member of the group of priority user accounts, enqueuing a work item to a message queue, wherein the work item indicates updating the least recently used ordering of the first files based on the file operation.

18. The non-transitory computer-readable medium of claim 17, wherein the completion callback is a first completion callback, wherein the file operation is a first file operation, wherein the use account is a first user account, wherein the work item is a first work item, and wherein the operations further comprise:
- based on determining that a second completion callback for a second file operation has occurred, and in response to determining that a second user account that requested that the second file operation be performed is not a member of the group of priority user accounts, refraining from enqueuing a second work item to the message queue.

19. The non-transitory computer-readable medium of claim 17, wherein the completion callback is a first completion callback, wherein the file operation is a first file operation that comprises a write operation or a modify operation, wherein the work item is a first work item, and wherein the operations further comprise:
- based on determining that a second completion callback for a second file operation has occurred, wherein the second file operation comprises a read operation, refraining from enqueuing a second work item to the message queue.

20. The non-transitory computer-readable medium of claim 15, wherein the operations further comprise:
- based on determining that a completion callback for a file operation has occurred, and, in response to determining that a user account that requested that the file operation be performed is a member of the group of priority user accounts, enqueuing a work item to a message queue, wherein the work item indicates updating the least recently used ordering based on the file operation.

* * * * *